US010496276B2

(12) United States Patent
Grieves et al.

(10) Patent No.: US 10,496,276 B2
(45) Date of Patent: Dec. 3, 2019

(54) QUICK TASKS FOR ON-SCREEN KEYBOARDS

(71) Applicant: Microsoft Technology Licensing, LLC, Redmond, WA (US)

(72) Inventors: Jason A. Grieves, Redmond, WA (US); Eric Norman Badger, Redmond, WA (US); Drew E. Linerud, Duvall, WA (US); Hector Barbera, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 38 days.

(21) Appl. No.: 14/035,758

(22) Filed: Sep. 24, 2013

(65) Prior Publication Data

US 2015/0089428 A1    Mar. 26, 2015

(51) Int. Cl.
*G06F 3/0489* (2013.01)
*G06F 3/023* (2006.01)
(Continued)

(52) U.S. Cl.
CPC .......... *G06F 3/0489* (2013.01); *G06F 3/0233* (2013.01); *G06F 3/04886* (2013.01); *G06F 17/211* (2013.01); *G06F 17/2264* (2013.01)

(58) Field of Classification Search
CPC .... G06F 3/0481; G06F 3/0489; G06F 3/0233; G06F 3/04886; G06F 17/24; G06F 9/4446
See application file for complete search history.

(56) References Cited

U.S. PATENT DOCUMENTS 5,621,875 A    4/1997  Mason et al.
5,818,437 A *  10/1998 Grover ............... G06F 3/0219
                                                715/811
(Continued)

FOREIGN PATENT DOCUMENTS

CN    101180798 A    5/2008
CN    102663016 A    9/2012
(Continued)

OTHER PUBLICATIONS

"International Search Report and Written Opinion Received for PCT Patent Application No. PCT/US2014/056424", dated Nov. 19, 2014, 10 Pages.
(Continued)

*Primary Examiner* — Ryan F Pitaro
*Assistant Examiner* — Parmanand D Patel
(74) *Attorney, Agent, or Firm* — NovoTechIP International PLLC (57) ABSTRACT

Quick tasks for on-screen keyboards are described in which an on-screen keyboard supports a plurality of quick tasks configured to edit selected text in defined ways. Quick task functions may be assigned to keys of the on-screen keyboard in addition to the default actions or "normal" character entry functions of the keys. During text input, the keys operate normally to perform a function related to character entry, such as to cause input of corresponding text character. When text is selected or in other designated interaction scenarios, operation of a key associated with a quick task may automatically trigger the quick task to modify selected text in a corresponding way. Thus, the same key of an on-screen keyboard may be employed to initiate a function related to character entry or apply of a quick task to text depending upon the interaction scenario.

19 Claims, 8 Drawing Sheets

(51) Int. Cl.
*G06F 3/0488* (2013.01)
*G06F 17/21* (2006.01)
*G06F 17/22* (2006.01)

(56) References Cited

U.S. PATENT DOCUMENTS

| | | | |
|---|---|---|---|
| 7,167,178 B2 | 1/2007 | Curelet-Balan | |
| 7,761,175 B2* | 7/2010 | Gutowitz | G06F 3/0236 341/23 |
| 8,374,846 B2 | 2/2013 | Assadollahi | |
| 2005/0149879 A1 | 7/2005 | Jobs et al. | |
| 2005/0187754 A1 | 8/2005 | Suess | |
| 2008/0242353 A1 | 10/2008 | Willey | |
| 2008/0291059 A1* | 11/2008 | Longe | G06F 3/0237 341/22 |
| 2009/0063129 A1* | 3/2009 | Tsai | G06K 9/228 704/3 |
| 2009/0076792 A1 | 3/2009 | Lawson-Tancred | |
| 2011/0041049 A1* | 2/2011 | Verdier | G06F 3/0489 715/227 |
| 2011/0316800 A1* | 12/2011 | Chacho | G06F 17/276 345/173 |
| 2012/0235921 A1* | 9/2012 | Laubach | G06F 3/0238 345/172 |
| 2013/0019175 A1 | 1/2013 | Kotler et al. | |
| 2013/0082935 A1 | 4/2013 | Duggan et al. | |
| 2013/0097548 A1* | 4/2013 | Yang | G06F 3/0238 715/773 |
| 2013/0120267 A1 | 5/2013 | Pasquero et al. | |
| 2013/0246329 A1* | 9/2013 | Pasquero | G06F 17/276 706/52 |
| 2013/0275506 A1* | 10/2013 | Warner | H04L 67/22 709/204 |
| 2015/0019653 A1* | 1/2015 | Terpstra | H04L 51/08 709/206 |

FOREIGN PATENT DOCUMENTS

| | | |
|---|---|---|
| CN | 102707798 A | 10/2012 |
| CN | 102866827 A | 1/2013 |
| EP | 1890222 | 2/2008 |
| JP | H03260760 A | 11/1991 |
| JP | H06203011 A | 7/1994 |
| JP | H11272403 A | 10/1999 |
| JP | 2004171371 A | 6/2004 |
| JP | 2005182571 A | 7/2005 |
| JP | 2009193598 A | 8/2009 |
| RU | 2392656 C2 | 6/2006 |
| RU | 2464648 C2 | 6/2011 |

OTHER PUBLICATIONS

"International Preliminary Report on Patentability", Application No. PCT/US2014/056424, dated Apr. 7, 2016, 7 pages.
"Foreign Office Action", Application No. MX/a/2016/003721, dated Jun. 12, 2017, 5 pages.
"First Office Action and Search Report Issued in Chinese Patent Application No. 201480052683.3", dated Nov. 3, 2017, 14 Pages.
"Office Action Issued in Mexican Patent Application No. MX/a/2016/003721", dated Feb. 1, 2018, 14 Pages.
"Office Action Issued in European Patent Application No. 14781766.2", dated May 4, 2018, 4 Pages.
"Second Office Action and Search Report Issued in Chinese Patent Application No. 201480052683.3", dated Jul. 16, 2018, 16 Pages.
"Office Action and Search Report Issued in Russian Patent Application No. 2016110577", dated Jul. 19, 2018, 7 Pages. (W/O English Translation).
"Office Action Issued in Japanese Patent Application No. 2016-544000", dated Aug. 6, 2018, 9 Pages.
Fuyuhiko, Ikeda, "Standard IM Married with OS", In Book MAC POWER, 2010, vol. 2, Sep. 3, 2010, 6 Pages.
Gazer, "iPhone 4S Super Manual to Perfectly Use all the Features and Operations", Published by Shuwa System Co., Dec. 3, 2011, 5 Pages.
"Office Action Issued in Mexican Patent Application No. MX/a/2016/003721", dated Oct. 15, 2018, 7 Pages.
"Examination Report Issued in Australian Patent Application No. 2014327147", dated Apr. 11, 2019, 3 Pages.
"Office Action Issued in European Patent Application No. 14781766.2", dated Mar. 13, 2019, 04 Pages.
"Third Office Action and Search Report Issued in Chinese Patent Application No. 201480052683.3", dated Feb. 15, 2019, 10 Pages.

* cited by examiner

QUICK TASKS FOR ON-SCREEN KEYBOARDS

BACKGROUND

Computing devices, such as mobile phones, portable and tablet computers, entertainment devices, handheld navigation devices, and the like are commonly implemented with on-screen keyboards (e.g., soft keyboards) that may be employed for text input and/or other interaction with the computing devices. When a user inputs or edits text characters via a text box or otherwise interacts with text using an on-screen keyboard, editing the text that is input may be difficult on some devices. For example, formatting text, inserting missing characters, and/or changing/translating an input text string on a mobile phone can be challenging due to limited size of the device and on-screen keyboard. Although text prediction candidates may be provided for mistyped word, text predictions traditionally do not address scenarios like missed punctuation, symbol insertions, language translations, and so forth. Thus, these text editing tasks remain challenging to accomplish using traditional on-screen keyboards

SUMMARY

Quick tasks for on-screen keyboards are described herein. In one or more implementations, an on-screen keyboard may support a plurality of quick tasks configured to edit selected text in defined ways. Quick task functions may be assigned to keys of the on-screen keyboard in addition to the default actions or "normal" character entry functions of the keys. During text input (e.g., when a cursor is active), the keys operate normally to perform a function related to character entry, such as to cause input of corresponding text characters. When text is selected or in other designated interaction scenarios, operation of a key associated with a quick task may automatically trigger the quick task to modify selected text in a corresponding way. Thus, the same key of an on-screen keyboard may be employed to initiate a function related to character entry or apply of a quick task to text depending upon the interaction scenario.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

When a user inputs text characters into a text box using an on-screen keyboard, editing the text that is input may be difficult on some small form factor devices. For example, formatting text, inserting missing characters, and/or changing/translating an input text string on a mobile phone can be challenging due to limited size of the device and on-screen keyboard.

Quick tasks for on-screen keyboards are described herein. In accordance with described techniques, an on-screen keyboard may support a plurality of quick tasks configured to edit selected text in defined ways. Quick task functions may be assigned to keys of the on-screen keyboard in addition to the default actions or "normal" character entry functions of the keys. During text input (e.g., when a cursor is active), the keys operate normally to perform a function related to character entry, such as to cause input of corresponding text character. When text is selected or in other designated interaction scenarios, operation of a key associated with a quick task may automatically trigger the quick task to modify selected text in a corresponding way. Thus, the same key of an on-screen keyboard may be employed to initiate a function related to character entry or apply of a quick task to text depending upon the interaction scenario.

In the discussion that follows, a section titled "Operating Environment" describes an example environment that may be employed in accordance with one or more implementations of quick tasks for on-screen keyboards. Following this, a section titled "Quick Task Details" describes example details and procedures for quick tasks in accordance with one or more implementations. Last, a section titled "Example System" is provided that describes example systems and devices that may be employed for one or more implementations of quick tasks for on-screen keyboards.

Operating Environment

Figure 1:
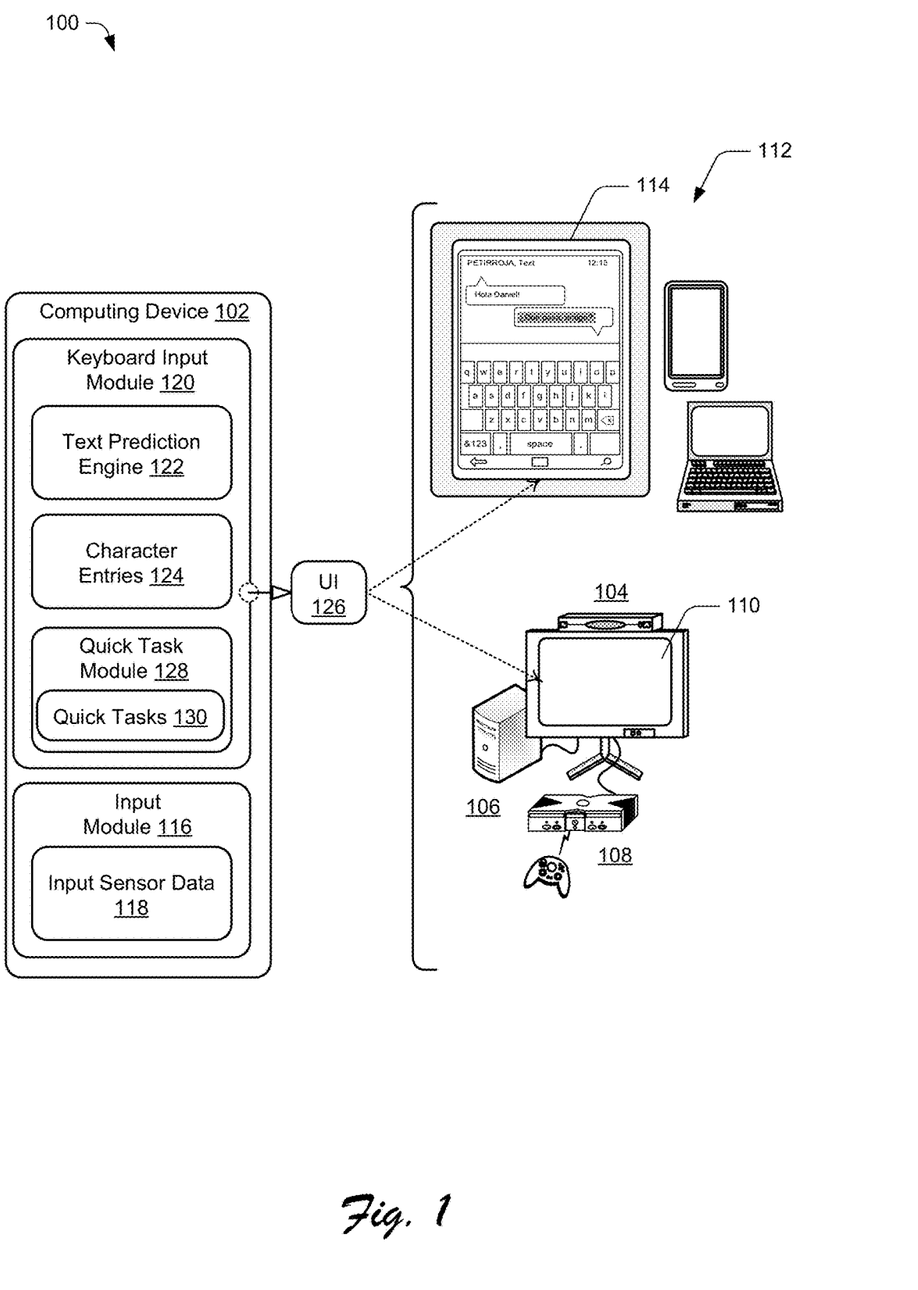
FIG. 1 illustrates an example operating environment in which aspects of quick task for on-screen keyboards can be implemented.

FIG. 1 illustrates an example system 100 in which embodiments of quick task for on-screen keyboards can be implemented. The example system 100 includes a computing device 102, which may be any one or combination of a fixed or mobile device, in any form of a consumer, computer, portable, communication, navigation, media playback, entertainment, gaming, tablet, and/or electronic device. For example, the computing device 102 can be implemented as a television client device 104, a computer 106, and/or a gaming system 108 that is connected to a display device 110 to display media content. Alternatively, the computing device may be any type of portable computer, mobile phone, or portable device 112 that includes an integrated display 114. Any of the computing devices can be implemented with various components, such as one or more processors and memory devices, as well as with any combination of differing components as further described with reference to the example device shown in FIG. 8.

The integrated display 114 of a computing device 102, or the display device 110, may be a touch-screen display that is implemented to sense touch and gesture inputs, such as a user-initiated character, key, typed, or selector input in a user interface that is displayed on the touch-screen display. Alternatively or in addition, the examples of computing devices may include other various input mechanisms and devices, such as a keyboard, mouse, on-screen keyboard, remote control device, game controller, or any other type of user-initiated and/or user-selectable input device.

In implementations, the computing device 102 may include an input module 116 that detects and/or recognizes input sensor data 118 related to various different kinds of inputs such as on-screen keyboard character inputs, touch input and gestures, camera-based gestures, controller inputs, and other user-selected inputs. The input module 116 is representative of functionality to identify touch input and/or gestures and cause operations to be performed that correspond to the touch input and/or gestures. The input module 116, for instance, may be configured to recognize a gesture detected through interaction with a touch-screen display (e.g., using touchscreen functionality) by a user's hand. In addition or alternatively, the input module 116 may configured to recognize a gesture detected by a camera, such as waving of the user's hand, a grasping gesture, an arm position, or other defined gesture. Thus, touch inputs, gestures, and other input may also be recognized through input sensor data 118 as including attributes (e.g., movement, selection point, positions, velocity, orientation, and so on) that are usable to differentiate between different inputs recognized by the input module 116. This differentiation may then serve as a basis to identify a gesture from the inputs and consequently an operation that is to be performed based on identification of the gesture.

The computing device includes a keyboard input module 120 that can be implemented as computer-executable instructions, such as a software application or module that is executed by one or more processors to implement the various embodiments described herein. The keyboard input module 120 represent functionality to provide and manage an on-screen keyboard for keyboard interactions with the computing device 102. The keyboard input module 120 may be configured to cause representations of an on-screen keyboard to be selectively presented at different times, such as when a text input box, search control, or other text input control is activated. An on-screen keyboard may be provided for display on an external display, such as the display device 110 or on an integrated display such as the integrated display 114. In addition, note that a hardware keyboard/input device may also implement an adaptable "on-screen" keyboard having at least some soft keys suitable for the techniques described herein. For instance, a hardware keyboard provided as an external device or integrated with the computing device 102 may incorporate a display device, touch keys, and/or a touchscreen that may be employed to implement quick tasks as described herein. In this case, the keyboard input module 120 may be provided as a component of a device driver for the hardware keyboard/input device.

The keyboard input module 120 may include or otherwise make use of a text prediction engine 122 that represents functionality to process and interpret character entries 124 to form and offer predictions of candidate words corresponding to the character entries 124. For example, an on-screen keyboard may be selectively exposed in different interaction scenarios for input of text in a text entry box, password entry box, search control, data form, message thread, or other text input controls of a user interface 126, such as a form, HTML page, application UI, or document to facilitate user input of character entries 124 (e.g., letters, numbers, and/or other alphanumeric characters).

In general, the text prediction engine 122 ascertains one or more possible candidates that most closely match character entries 124 that are input. In this way, the text prediction engine 122 can facilitate text entry by providing one or more predictive words that are ascertained in response to character entries 124 that are input by a user. For example, the words predicted by the text prediction engine 122 may be employed to perform auto-correction of input text, present one or more words as candidates for selection by a user to complete, modify, or correct input text, automatically change touch hit areas for keys of the on-screen keyboard that correspond to predicted words, and so forth.

In accordance with techniques described herein, the keyboard input module 120 may be configured to include or make use of a quick task module 128 as described above and below. Generally, the quick task module 128 is representative of functionality to support a plurality of quick tasks 130 for an on-screen keyboard. The quick tasks 130 are configured to facilitate editing operations that are traditionally difficult to perform using an on-screen keyboard. The types of editing operations for which corresponding quick tasks may be made available include but are not limited to formatting, punctuation, symbol insertion, translations, and combinations thereof. Various non-limiting examples of quick tasks are described in relation to the following figures. A set of quick tasks 130 each designed to perform a different editing operation may be assigned to keys of an on-screen keyboard in addition to character entry functions or actions for the keys. The quick task module 128 may be operable to manage assignment of quick tasks 130 to keys, activation and deactivation of the quick tasks, creation of customized quick tasks, and so forth. The quick task module 128 may also operate to recognize interaction scenarios associated with quick tasks (e.g., text selections, cursor position, context, etc.) and apply appropriate quick tasks to modify selected text when a quick task is triggered. Quick task module 128 may also implement logic to determine whether to perform a default function (e.g., insert a text character) or perform a quick task assigned to a key responsive to operation of the key. Further details regarding these and other aspects of quick tasks for on-screen keyboards may be found in relation to the following figures.

Having described an example operating environment for quick tasks, consider now example techniques and details that can be utilized in one more implementation described herein.

Quick Task Details

Figure 2:
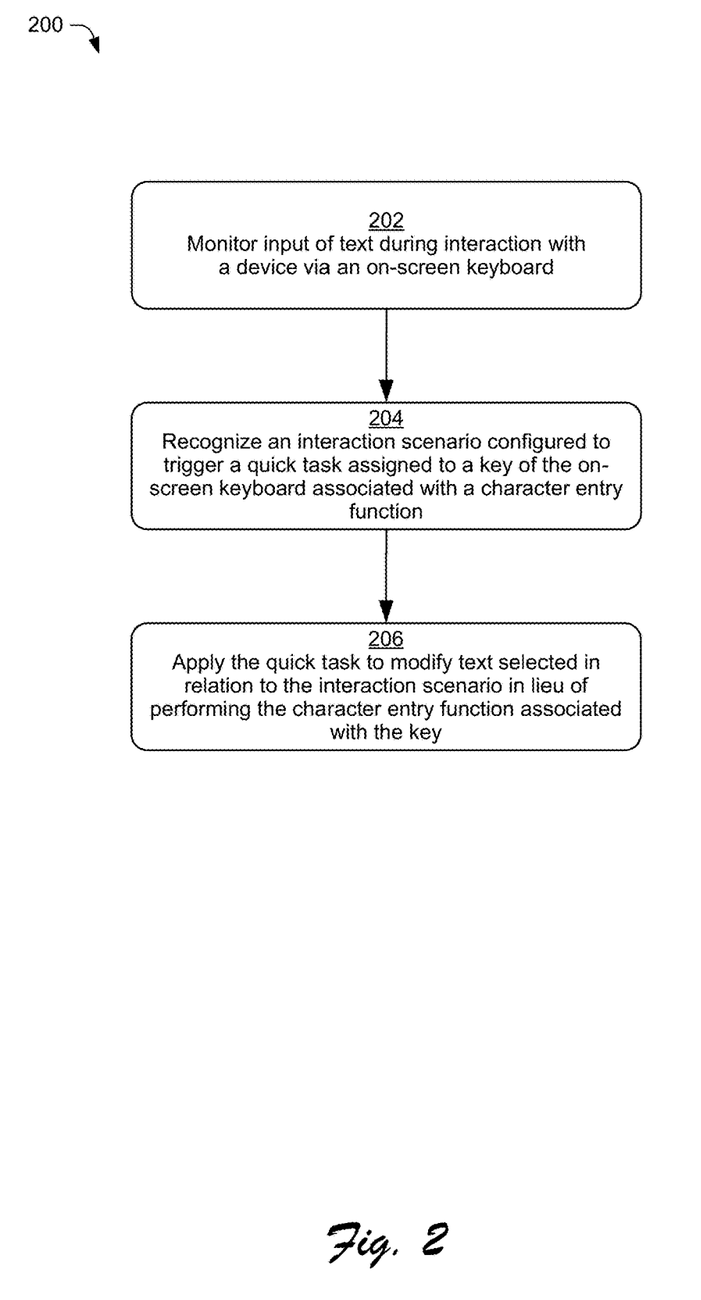
FIG. 2 depicts an example procedure in which a quick task is applied in accordance with one or more implementations.
Figure 3:
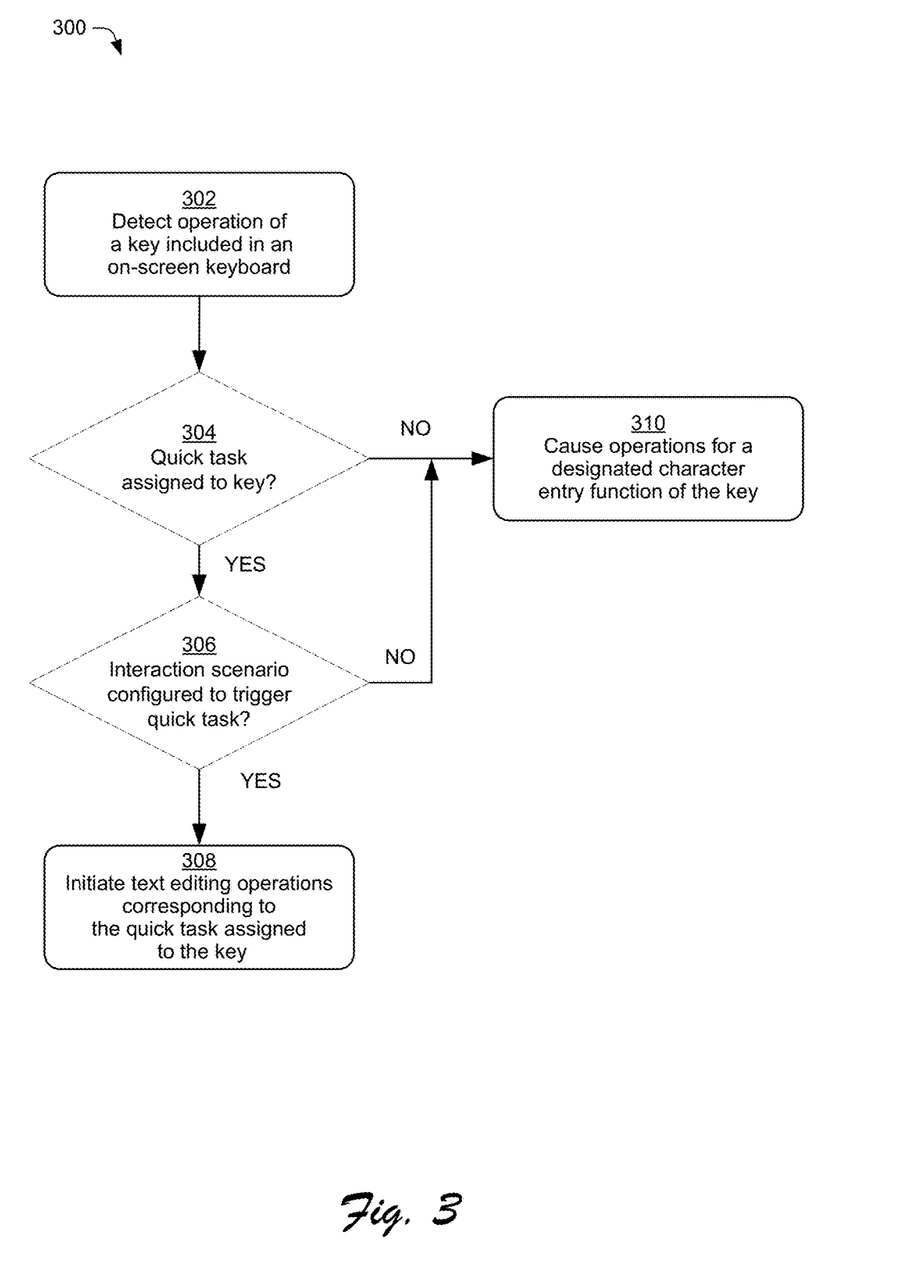
FIG. 3 depicts an example procedure that represents logic to determine when to apply quick tasks in accordance with one or more implementations.
Figure 4:
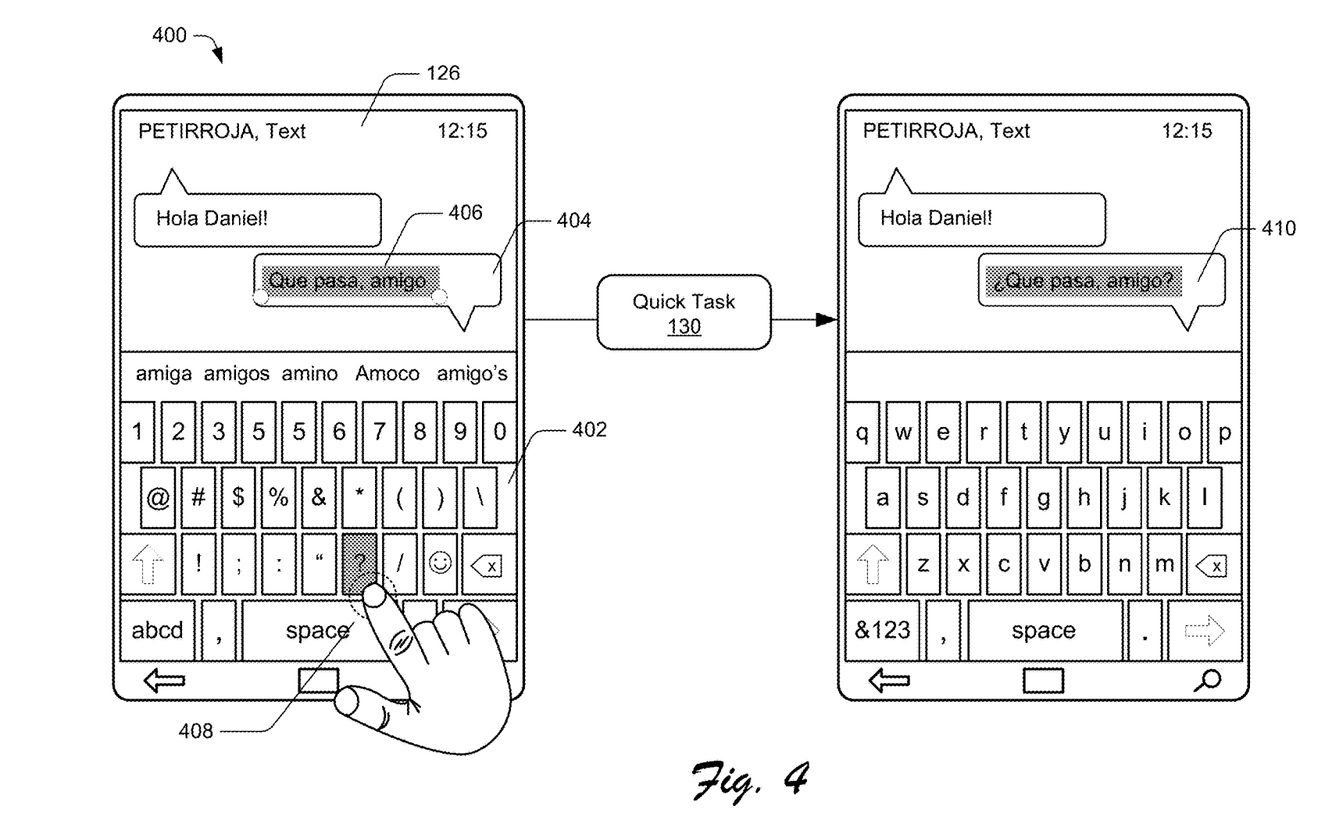
FIG. 4 illustrates an example quick task scenario in accordance with one or more implementations.
Figure 5:
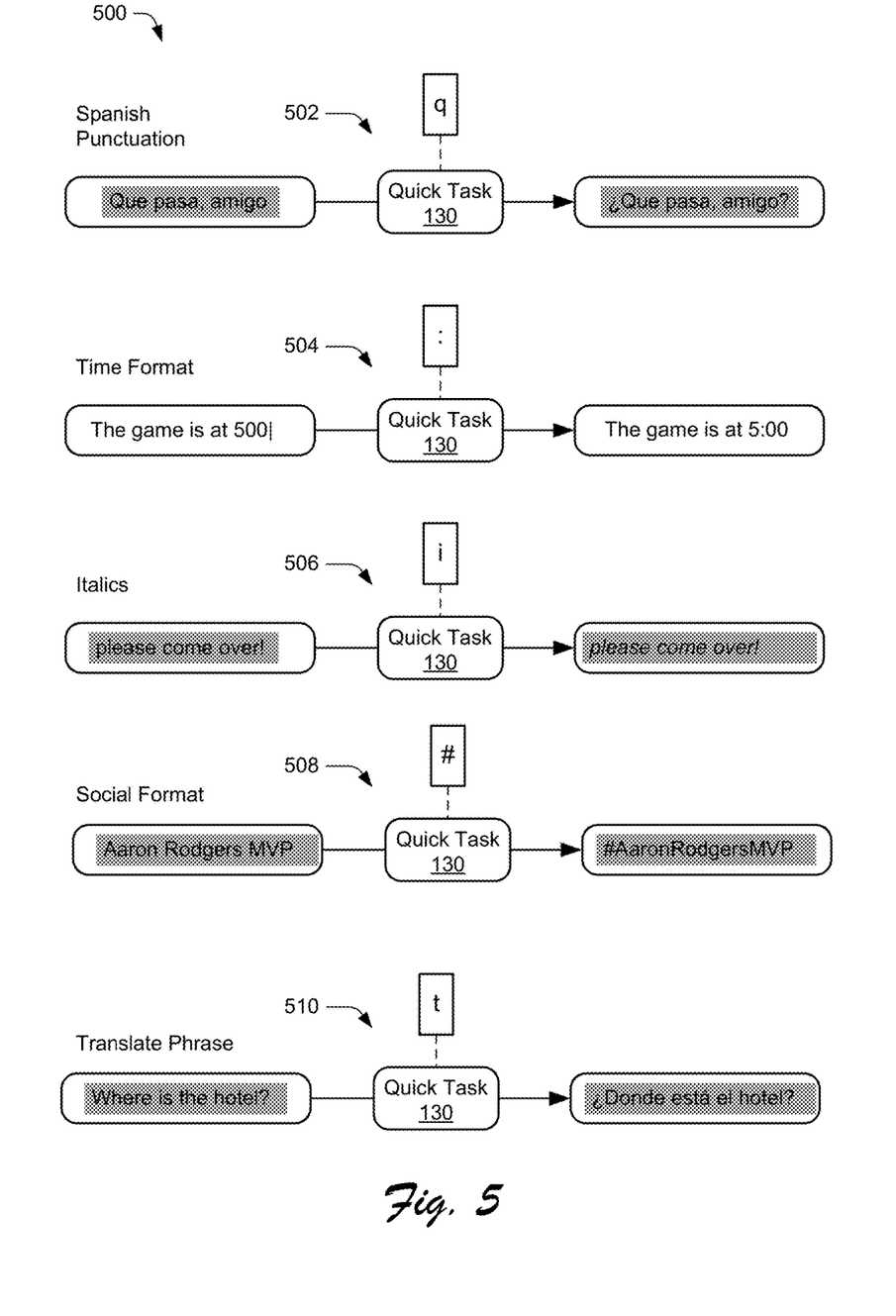
FIG. 5 illustrates various example quick tasks in accordance with one or more implementations.
Figure 6:
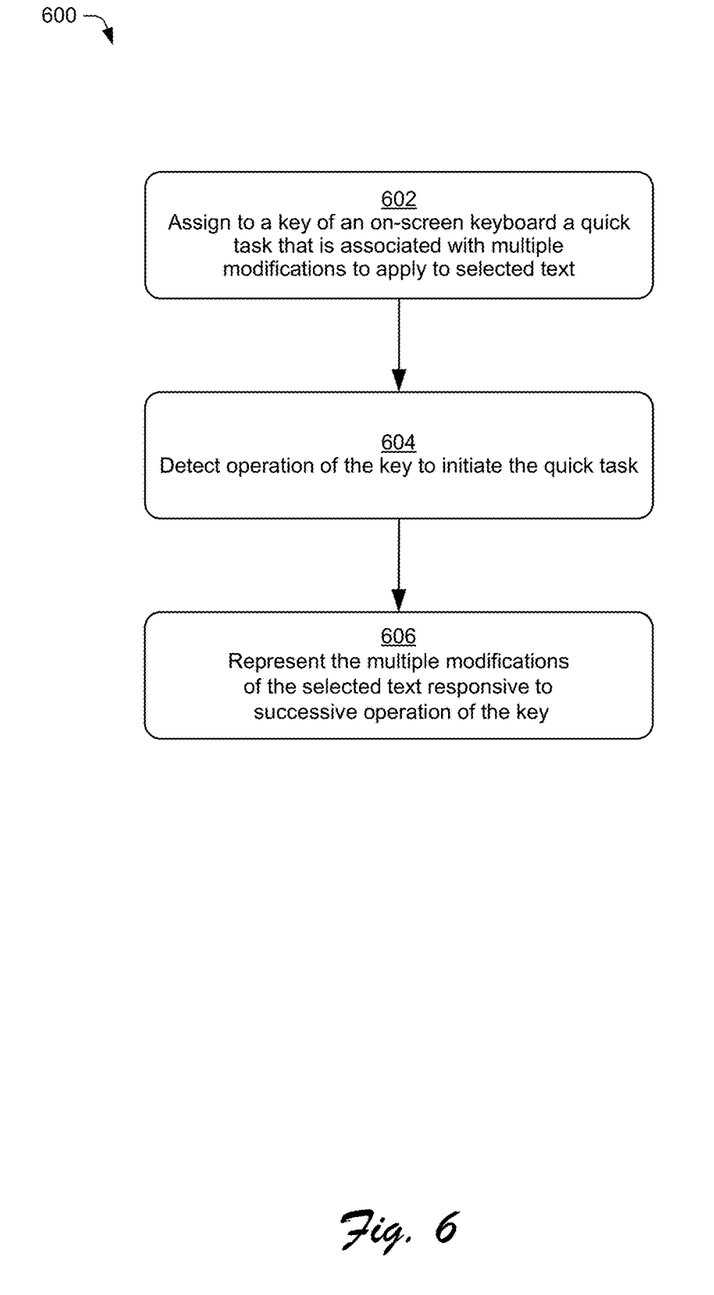
FIG. 6 depicts an example procedure in which multiple modifications associated with a quick task are represented for selected text in accordance with one or more implementations.
Figure 7:
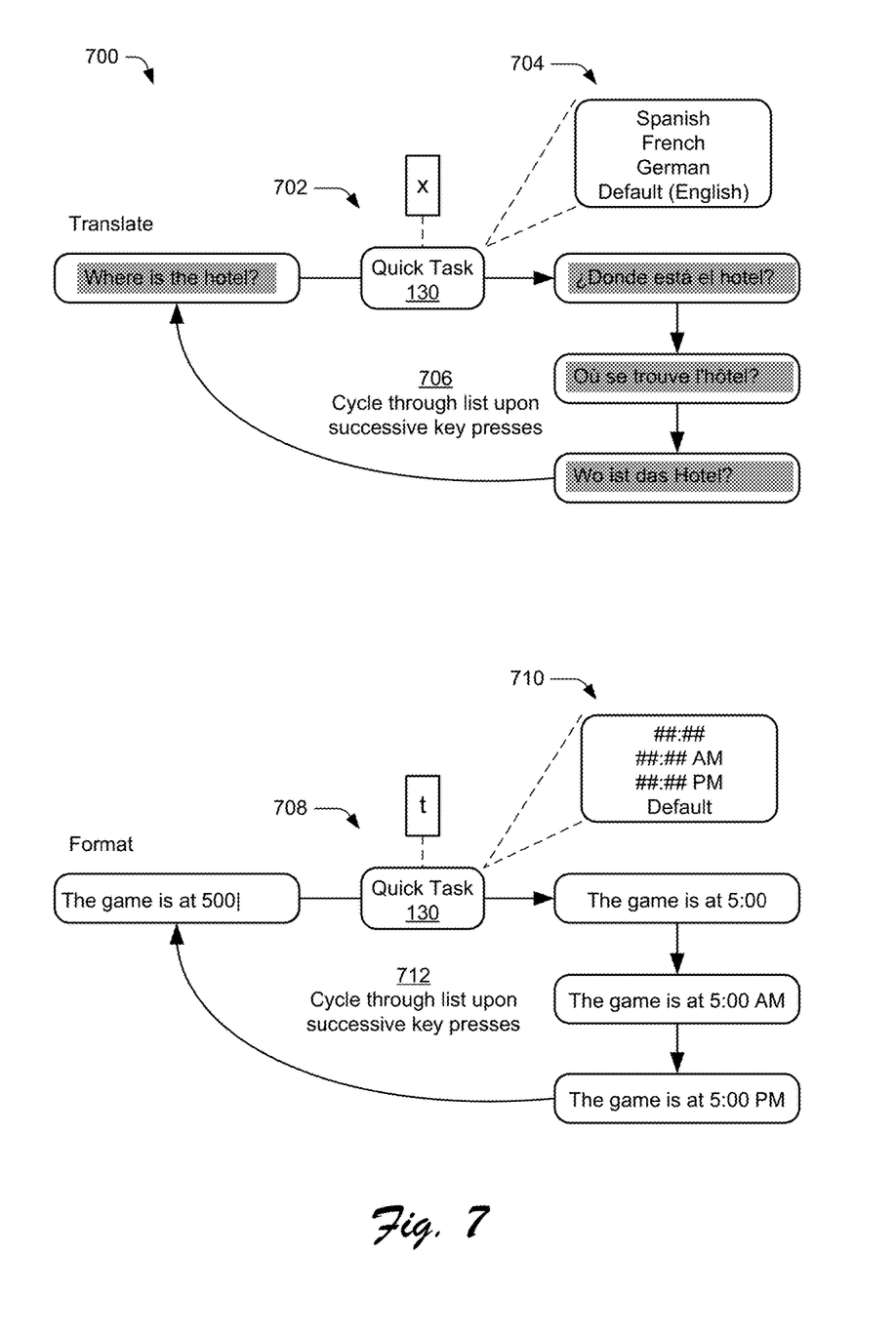
FIG. 7 illustrates various examples of quick tasks associated with multiple modifications in accordance with one or more implementations.

This section discusses details of techniques that employ quick tasks with reference to the example procedures of FIGS. 2, 3, and 6 and the example representations of FIGS. 4, 5, and 7. In portions of the following discussion reference may be made to the example operating environment of FIG. 1 in which various aspects may be implemented. Aspects of each of the procedures described below may be implemented in hardware, firmware, or software, or a combination thereof. The procedures are shown as a set of blocks that specify operations performed by one or more devices and are not necessarily limited to the orders shown for performing the operations by the respective blocks. In at least some implementation the procedures may be performed by a suitably configured computing device, such as the example computing device 102 of FIG. 1 that includes or makes use of a quick task module 128 or comparable functionality.

FIG. 2 depicts a procedure 200 in which a quick task is applied in accordance with one or more implementations. Input of text is monitored during interaction with a device via an on-screen keyboard (block 202). For example, text may be input by way of an on-screen keyboard of a mobile device. While aspects herein are described in relation to an on-screen keyboard, it should be appreciated that comparable techniques for applying quick tasks may be implemented using a hardware keyboard having a touch-sensitive keyboard, voice commands, or other input mechanism. A mobile phone or other computing device 102 may be configured to detect and process input to represent entered text within a user interface output via the device. In addition, the computing device 102 may make use of a quick task module 128 to trigger quick tasks in appropriate circumstances. To do so, the quick task module 128 may be configured to monitor text input and keystrokes and make determinations regarding when to initiate quick tasks depending upon the interaction scenario.

In particular, an input scenario is recognized that is configured to trigger a quick task assigned to a key of the on-screen keyboard associated with a character entry function (block 204). Then, the quick task is applied to modify text selected in relation to the interaction scenario in lieu of performing the character entry function associated with the key (block 206). As mentioned keys of the on-screen keyboard may be associated with both character entry functions and quick task functions. In response to operation a particular key, the quick task module 128 is configured to determine whether to perform the "normal" character entry functions or a quick task corresponding to the particular key. This determination may be based at least in part upon recognition of the current interaction scenario. The interaction scenario as used herein reflects the particular keystroke (or sequence of keystroke) and the state or context of the interaction. An interaction scenario may be recognized in connection with operation of a particular key. For example, pressing the "T" key of an on-screen keyboard when a cursor (e.g., caret) is active may cause the corresponding character "t" to be entered at a location of the cursor. On the other hand, if a text string is selected and then the "T" key is pressed, this particular interaction scenario may be associated with a quick task function, such as a translate quick task to translate selected text between different languages automatically. Accordingly, the quick task module 128 recognizes the interaction scenario as being associated with a quick task and initiates the quick task function associated with the "T" key to modify the selected text string (e.g., by translation) instead of inserting the character "t". Thus, one way to recognize interaction scenarios that trigger quick tasks is by determining whether a cursor is active or a text string is selected in relation to operation of a key. In other words, the quick task module 128 may distinguish between different states for input of text including at least an active cursor state corresponding to character entry functions and a state in which a text string is selected associated with quick tasks.

In an implementation, the quick task module 128 may also be configured to perform semantic processing of text that is entered and/or selected to inform the decision regarding whether to apply a quick task or perform a character entry function. Here, the quick task module 128 may parse input text to infer an intended meaning based on word combinations/probabilities, a library/history of typical word usage, user specific lexicon, and so forth. If a quick task assigned to a current keystroke is consistent with the intended meaning derived from semantic processing, the quick task module 130 recognizes this as a state in which to apply the quick task. Thus, recognition of an interaction scenario as a trigger for a quick task may be further based in whole or in part upon semantic processing of text that is input during interaction with a device.

Notably, the quick task module 128 is configured to apply a least some quick tasks based on operation of a single key (e.g., singular operation) as opposed to a combination of keys. The quick task module 128 automatically decides when a key is operated which of multiple functions assigned to the key to perform depending on the interaction scenario. Each function may be initiated by singular operation of the key (e.g., a single keystroke). Thus, quick tasks may be implemented and applied without using keystroke combinations and/or modifier key combinations (e.g., alt+A, ctrl+B, etc.) used for some traditional keyboard shortcuts. Since screen real estate may be limited for on-screen keyboards of mobile devices and key combinations may be difficult to perform on a small screen, the singular key operation approach employed for quick tasks makes editing tasks easy for user to accomplish and enhances the overall user experience. Moreover, an on-screen keyboard may support a plurality of quick tasks assigned to different keys and may enable a user to change the assignments and make user-specified assignments of pre-defined quick tasks to selected keys. The system may be further configured to facilitate creation and assignment of custom quick tasks by users.

FIG. 3 depicts a procedure 300 that represents logic to determine when to apply quick tasks in accordance with one or more implementations. Operation of a key included in an on-screen keyboard is detected (block 302). This may occur based upon monitoring of text input as discussed in relation to FIG. 2. In one approach, the quick task module 128 may implement logic to monitor each keystroke and control whether to perform normal actions/character input or quick tasks assigned to the keys based on the interaction scenario. To illustrate, assume a quick task configured to format a selected text string by underlining the text is assigned to the "U" key. The quick task module 128 may detect when the "U" key is depressed or otherwise operated during a text entry interaction and decide whether to apply the underlining quick task or cause insertion of the alphanumeric character for the "U" key.

In particular, a determination is made regarding whether a quick task is assigned to the key (block 304). For example, the quick task module 128 may reference a table or other suitable data structure that maps quick tasks to keys. In the above example, the quick task module 128 recognizes that the underlining quick task is assigned to the "U" key. For some keys, the quick task module 128 may determine that a quick task is not assigned to and/or is disabled for the keys.

If a quick task is assigned to the key per block 304, the interaction scenario is then analyzed to determine whether the interaction scenario is configured to trigger the quick task (block 306). When the interaction scenario triggers the quick task, text editing operations corresponding to the quick task assigned to the key are initiated (block 308). On the other hand, the quick task module 128 may cause operations for a designated character entry function of the key (block 310) responsive to a determination that a quick task is not assigned to the key per block 304 and/or a determination that the interaction scenario does not trigger the quick task per block 306.

For instance, a quick task may be selectively triggered based on the current state of the interaction. This may be based upon whether a cursor is active or inactive for text input or alternatively whether a text selection has been made by a user. Contextual information regarding input text may also be used to determine how to respond to operation of keystrokes. In cases when the cursor is active, key operation may cause a designated character entry function in a normal way. On the other hand, when text is selected (e.g., highlighted) quick tasks corresponding to keys may be enabled and operation of a key may then cause the corresponding quick task instead of the character entry function. In the above example, operation of the "U" key may cause underlining of selected text when the text has been selected prior to operation of the key. On the other hand, in a normal text entry mode with an active cursor, operation of the "U" key may trigger operations to insert a corresponding alphanumeric character (e.g., u or U in this example).

FIG. 4 illustrates performance of a quick task in accordance with an example interaction scenario, generally at 400. In particular, a user interface 126 configured for interaction with a text messaging application/service is depicted having an on-screen keyboard 402 for a mobile phone device. The interface includes a text input control 404 in the form of a text message input box. In the depicted example, a user has interacted with the text input control 404 to input the text characters "Que pasa, amigo." Additionally, the user has interacted to make a selection 406 of the text characters and accordingly, the phrase "Que pasa, amigo" is represented as being highlighted. In this scenario, the selection 406 may be effective to activate quick tasks in accordance with techniques described herein.

As represented in the example of FIG. 4, a keystroke 408 for selection of a "?" key may result in performance of an assigned quick task 130 that inserts characters for Spanish language questions before and after a selected phrase. Thus, a modification 410 of the phrase "Que pasa, amigo" is made responsive to the keystroke 408 to change the phrase to " ¿ Que pasa, amigo?" Without the quick task, insertion of the characters before and after the phrase may be quite difficult and inefficient using an on-screen keyboard of a mobile device. Insertions of other foreign language characters for punctuations in a comparable manner are also contemplated. Additionally, a variety of types of quick tasks and individual quick tasks may be supported by an on-screen keyboard, some illustrative examples of which are depicted and described in relation to FIG. 5.

FIG. 5 depicts various examples of quick task that may be assigned to keys of an on-screen keyboard generally at 500. For instance, a punctuation quick task 502 to automatically modify punctuation of a selected phrase or string is depicted. Here, the punctuation quick task 502 corresponds to the example of FIG. 4 except that the quick task is represented as being assigned to the "Q" key rather than the "?" key. This example therefore illustrates that at least some quick tasks may be assigned to different keys and in some cases a user may be able to specify and change the mapping of quick tasks to keys. In general, a quick task 130 may be configured to perform punctuation operations to insert characters before and after a selected text phrase, one example of which is the insertion the of question mark characters. Other punctuation quick tasks may be configured to facilitate enclosing a phrase with parentheses using a ")" or "(" key, bracketing a phrase using a "[", "]", "{", or "}" key, an html tag using a ">" or "<" key, inserting opening and closing exclamation points using an "!" key and so forth. Note that some quick tasks may be assigned to multiple keys. For example, pressing either the opening parenthesis "(" or the closing parenthesis ")" keys may trigger a corresponding quick task to enclose selected text in parentheses.

Additional quick tasks may be implemented to perform different types of formatting for selected text. Formatting quick tasks may be configured to perform insertion of special characters (e.g., time, currency, and social networking formatting), toggling of word or sentence case, toggling capitalization, switching between fonts, setting of text effects such as italics or bold, and so forth.

By way of example, a time format quick task 504 to format appropriate numbers in a text string as time values is also shown in FIG. 5. In the depicted example, the time format quick task 504 is assigned to a ":" key. Alternatively, the time format quick task 504 may be associated with and/or assigned by user to a different key such as a "t" key, a dedicated clock function key, or another selected key. When applied, the time format quick task 504 may insert characters for time formatting in appropriate locations within a text string. For example, the phrase "The game is at 500" is illustrated as being converted to "The game is at 5:00" responsive to application of the time format quick task 504. Note that in this example, the initial phrase is not selected or highlighted as in the preceding example. This is intended to represent a situation in which the quick task module 128 may recognize and employ the semantic context of an interaction scenario and automatically apply a quick task. Thus, a user may not have to explicitly make a text selection to employ some quick tasks. Here for example, the quick task module 128 may infer that the user intended "at 500" as a time indication. Accordingly, when the ":" key is operated, the time format quick task 504 is automatically applied rather than inserting a ":" at the illustrated cursor location.

An italics quick task 506 is depicted as another example of a formatting quick task that may be supported. Here, selection of text followed by operation of an "i" key causes selected text to be switched to an italicized font. In an implementation, operating the "i" again may cause the selected text to revert back to the non-italicized font. In general, quick tasks as discussed herein enable a user to cycle through and switch back and forth between text as input (e.g., initial text and formats) and one or more modifications of the text available through the quick tasks by successively operating key to which the quick tasks are assigned. Examples regarding quick tasks configured to cycle through multiple different modifications are discussed below in relation to FIGS. 6 and 7.

Quick tasks to perform a variety of formatting actions comparable to the examples just described may be defined and assigned to various selected keys. Some additional examples of formatting quick task that may be assigned to particular keys include but are not limited to "b" for bold text, "c" or "shift" for toggling case/capitalization of a word, phrase, or selection, "f" for changing to a different font, "u" for underlining, and so forth.

Another example involves automatic formatting of tags that may be used for social networking or other purposes. One type of tagging is the use of a "#" phrase for social networking posts. This kind of tagging may be used not only with social networking service but also in email, text messages, and other communications. FIG. 5 represents a social format quick task 508 that may be assigned to the "#" key. In operation, the social format quick task 508 operates to transform a phrase into a tag in a designated format. In the illustrated example, the input phrase "Aaron Rodgers MVP" is transformed by the quick task to "#AaronRodgersMVP". Here the indicator for the tag "#" has been inserted at the beginning of the input phrase and spaces have been removed. Other types of tags that use different indicators and even user defined formatting operations may be implemented through quick tasks.

FIG. 5 further represents a translate quick task 510 that may be assigned to the "t" key as shown, a keyboard language key, or other key. The translate quick task 510 may be applied to translate a phrase or selected text from one language to another. Here, the phrase "Where is the hotel?" may automatically be translated from English to another designated language, such as the Spanish version "¿Donde está el hotel?" The translation may occur by selection of the text and pressing of the "t" key or other key associate with the translate quick task 510. A user may be able to set a particular language to use for translations. In addition or alternatively, a translate quick task 510 may be configured to cycle through an ordered list of multiple languages, details of which are discussed in relation to the following figures.

FIG. 6 depicts a procedure 600 in which multiple modifications associated with quick tasks may be applied. A quick task that is associated with multiple modifications to apply to selected text is assigned to a key of an on-screen (block 602). Operation of the key to initiate the quick task is detected (block 604). Then, the multiple modifications of the selected text are represented responsive to successive operation of the key (block 606).

As mentioned, an on-screen keyboard that includes or makes use of a quick task module 128 may support some quick tasks that implement multiple modifications. In one approach, the multiple modifications are defined according to a list or data structure that specifies an order for application of the modifications. For example, a list of languages for translations may be associated with a translation quick task, a list of available fonts may be employed for a font selection quick task, and a time format task quick may include different available time formats. Other quick tasks may operate to toggle back and forth between unmodified text as input and a particular modification of the text. When a key associated with a quick task that provides multiple different modifications is selected multiple times, the system may cycle through the list of modification one after another and cause the modifications of corresponding text to successively appear in a user interface responsive to successive operation of the key. Thus, each time the key is "pressed", a different modification may appear in accordance with a progression down a list of available modifications for the quick task. When each modification in a list has been presented, the next selection of the particular key may cause the selected text to revert back to the unmodified form.

To further illustrate, FIG. 7 depicts generally at 700 some example scenarios in which quick tasks that implement multiple modifications are applied. For example, a translation quick task 702 is depicted as being associated with an "x" key. The translation quick task 702 in this example is associated with a list of languages 704. The list of languages 704 represents data associated with a quick task that is sufficient to define and/or control multiple modifications of texts and specify an order in which the modification are applied in relation to the quick task. Here, the list of languages 704 indicates successive translations to Spanish, French, German, and then back to the default language (in this case English). Upon successive presses of the "x" key, the quick task module 128 may operate to cycle through the list of languages 704 and apply the corresponding translations to the different language as represented at 706. The user may scroll successively through one or more of the possible modifications by pressing the key repeatedly and may select one of the modifications to keep by explicit selection, further text input, and/or after a timeout period of inactivity.

A comparable example of a time format quick task 708 that supports multiple modifications is also depicted in FIG. 7. In this scenario, the time format quick task 708 is represented as being associated with as a "t" key. The time format quick task 708 could also be assigned to the ":" key as with the time format quick task 504 discussed in relation to FIG. 5. The time format quick task 708 in this example is associated with a list of time formats 710. The list of time formats 710 indicates successive modifications of the time format for the associated text. Upon successive presses of the "t" key, the quick task module 128 may operate to cycle through the list of time formats 710 and apply the corresponding modifications as represented at 712. Accordingly the "at 500" portion of the text may change to "at 5:00", "at 5:00 AM", "at 5:00 PM", and back to "at 500" responsive to successive presses of the "t" key.

Generally, the assignments of quick task to keys may be pre-defined for an on-screen keyboard. In an implementation the assignments may also be configurable by a user to make user specific assignments. Thus, a user may choose to assign the translate quick task to "x" and the time format quick task to "t" as shown in FIG. 7 rather than pre-defined assignments, such as using "t" for translate and ":" for time as in FIG. 5. The quick task module 128 for instance may expose an interface through which a user may interact with a mapping that maps different available quick tasks to keys. Through the interface, the user may change the pre-defined assignments and/or may enable or disable quick tasks, globally or on an individual basis. Still further, the interface and quick task mapping may be configured to enable users to create custom quick task through a quick task creation dialog. The creation dialog may facilitate selection of custom character insertions, formatting, and/or triggers for quick tasks using suitable syntax, menus, fields, and tags and so forth. A custom quick task may be defined in accordance with user selections made via the quick task creation dialog. A custom quick task may be assigned to a key of the user's choosing. By way of example and not limitation, a user may define a combination quick task for bold, italics, and underlining that transforms a selected text string to a modified string with bold, italics, and underling. The user may make an assignment of this custom quick task to a key, such as the "z" key. In another example, a custom quick task may be created to facilitate insertion of selected special characters at particular locations within a text string. For example, an asterisk quick task may be defined to enclose text within asterisks, such as changing "Hello Robyn" to "*Hello Robyn*". A variety of other kinds of custom and pre-defined quick tasks are also contemplated.

Having described some example details and techniques related to quick tasks, consider now an example system that can be utilized in one more implementation described herein.

Example System and Device

Figure 8:
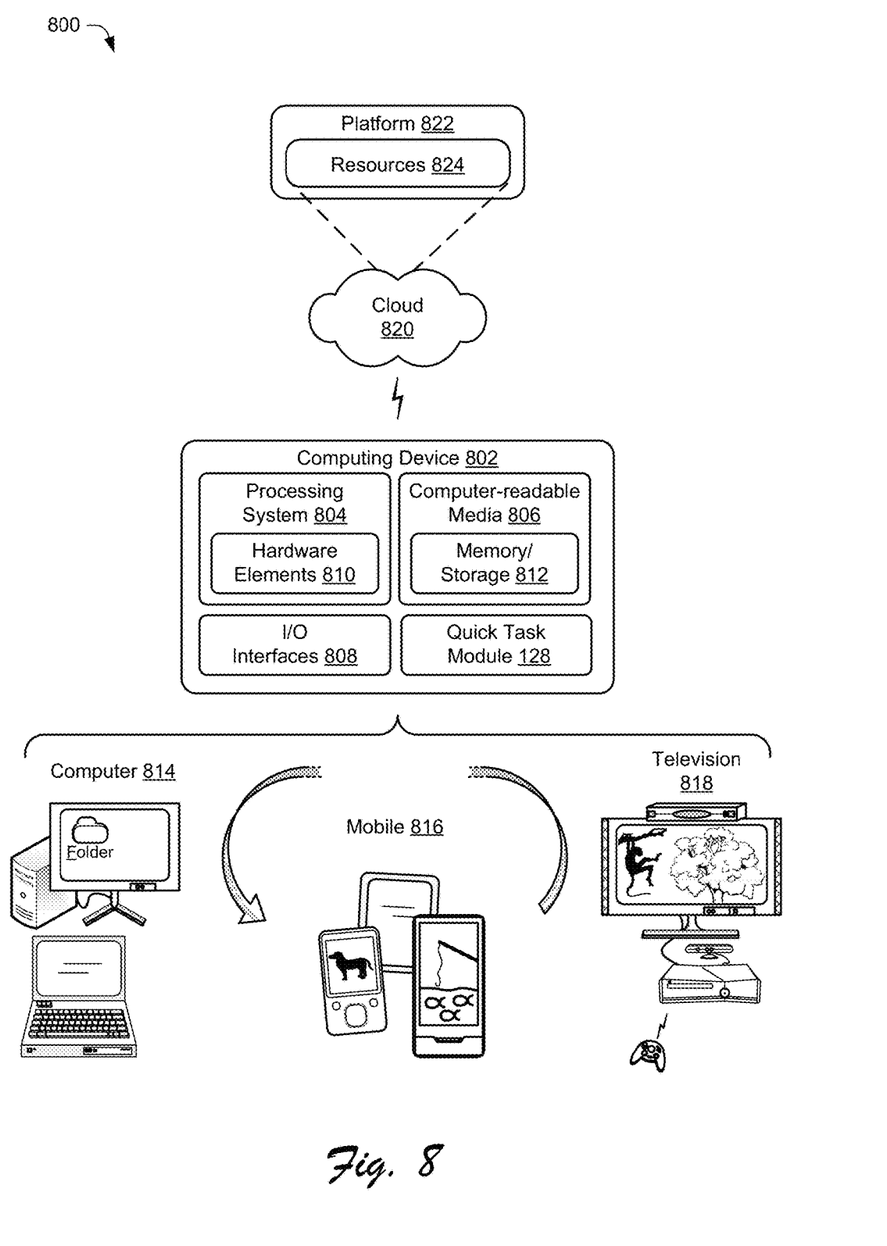
FIG. 8 depicts example systems and devices that may be employed in one or more implementations of adaptive language models for text predictions.

FIG. 8 illustrates an example system 800 that includes an example computing device 802 that is representative of one or more computing systems and/or devices that may implement the various techniques described herein. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 806 is illustrated as including memory/storage 812. The memory/storage 812 represents memory/storage capacity associated with one or more computer-readable media. The memory/storage 812 may include volatile media (such as random access memory (RAM)) and/or nonvolatile media (such as read only memory (ROM), Flash memory, optical disks, magnetic disks, and so forth). The memory/storage 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone for voice operations, a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, tactile-response device, and so forth. The computing device 802 may further include various components to enable wired and wireless communications including for example a network interface card for network communication and/or various antennas to support wireless and/or mobile communications. A variety of different types of antennas suitable are contemplated including but not limited to one or more Wi-Fi antennas, global navigation satellite system (GNSS) or global positioning system (GPS) antennas, cellular antennas, Near Field Communication (NFC) 214 antennas, Bluetooth antennas, and/or so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "communication media."

"Computer-readable storage media" refers to media and/or devices that enable storage of information in contrast to mere signal transmission, carrier waves, or signals per se. Thus, computer-readable storage media does not include signal bearing media or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Communication media" refers to signal-bearing media configured to transmit instructions to the hardware of the computing device 802, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules including text prediction engine 122, quick task module 128, and other program modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of modules as a module that is executable by the computing device 802 as software may be achieved at least partially in hardware, e.g., through use of computer-readable storage media and/or hardware elements 810 of the processing system. The instructions and/or functions may be executable/operable by one or more articles of manufacture (for example, one or more computing devices 802 and/or processing systems 804) to implement techniques, modules, and examples described herein.

As further illustrated in FIG. 8, the example system 800 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 800, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 802 may assume a variety of different configurations, such as for computer 814, mobile 816, and television 818 uses. Each of these configurations includes devices that may have generally different constructs and capabilities, and thus the computing device 802 may be configured according to one or more of the different device classes. For instance, the computing device 802 may be implemented as the computer 814 class of a device that includes a personal computer, desktop computer, a multi-screen computer, laptop computer, netbook, and so on.

The computing device 802 may also be implemented as the mobile 816 class of device that includes mobile devices, such as a mobile phone, portable music player, portable gaming device, a tablet computer, a multi-screen computer, and so on. The computing device 802 may also be implemented as the television 818 class of device that includes devices having or connected to generally larger screens in casual viewing environments. These devices include televisions, set-top boxes, gaming consoles, and so on.

The techniques described herein may be supported by these various configurations of the computing device 802 and are not limited to the specific examples of the techniques described herein. This is illustrated through inclusion of the quick task module 128 on the computing device 802. The functionality of the quick task module 128 and other modules may also be implemented all or in part through use of a distributed system, such as over a "cloud" 820 via a platform 822 as described below.

The cloud 820 includes and/or is representative of a platform 822 for resources 824. The platform 822 abstracts underlying functionality of hardware (e.g., servers) and software resources of the cloud 820. The resources 824 may include applications and/or data that can be utilized while computer processing is executed on servers that are remote from the computing device 802. Resources 824 can also include services provided over the Internet and/or through a subscriber network, such as a cellular or Wi-Fi network.

The platform 822 may abstract resources and functions to connect the computing device 802 with other computing devices. The platform 822 may also serve to abstract scaling of resources to provide a corresponding level of scale to encountered demand for the resources 824 that are implemented via the platform 822. Accordingly, in an interconnected device embodiment, implementation of functionality described herein may be distributed throughout the system 800. For example, the functionality may be implemented in part on the computing device 802 as well as via the platform 822 that abstracts the functionality of the cloud 820.

CONCLUSION

Although the techniques in the forgoing description has been described in language specific to structural features and/or methodological acts, it is to be understood that the subject matter of the appended claims is not necessarily limited to the specific features or acts described. Rather, the specific features and acts are disclosed as example forms of implementing the claimed subject matter.

The invention claimed is:

1. A method comprising:
   receiving a touch or gesture input via an on-screen keyboard, the touch or gesture input being indicative of a selection of a single key associated with a character entry function of the on-screen keyboard;
   recognizing, via a quick task module, an interaction scenario in connection with the selection of the single key, the interaction scenario configured to trigger a quick task assigned to the single key, the recognition being based at least in part on determining whether a text string in input of text received via the on-screen keyboard is selected; and
   upon receiving the touch or gesture input and recognizing the interaction scenario, automatically applying, via the quick task module, the quick task to modify the selected text string in lieu of performing the character entry function associated with the single key, the quick task automatically reformatting the selected text string according to a social networking format by removing one or more spaces between two or more words in the selected text string,
   wherein the selected text string is highlighted.

2. A method as recited in claim 1, wherein the on-screen keyboard is configured to support a plurality of quick tasks assigned to different keys of the on-screen keyboard.

3. A method as recited in claim 1, wherein recognizing the interaction scenario configured to trigger the quick task further comprises determining a meaning of one or more words that is input during interaction with the device.

4. A method as recited in claim 1, wherein the quick task assigned to the single key includes one or more formatting quick tasks to facilitate insertion of special characters, toggling of word case, toggling capitalization, switching between fonts, or setting of text effects in relation to the selected text string.

5. A method as recited in claim 1, wherein multiple functions assigned to the key including the quick task and the character entry function are operable by singular operation of the key depending upon the interaction scenario.

6. A method as recited in claim 1, wherein the character entry function is triggered to cause insertion of a text character corresponding to the key when a cursor is active for text entry and the quick task is triggered when the cursor is inactive for text entry responsive to recognition of the interaction scenario.

7. A method as recited in claim 1, wherein the quick task is configured to facilitate text editing functions to modify the selected text string including one or more of: formatting the selected text string, punctuation for the selected text string, symbol insertion in relation to the selected text string, or translation of the selected text string.

8. A method as recited in claim 1, further comprising:
exposing an interface to enable creation of the quick task as a custom quick task through a quick task creation dialog; and
defining the quick task in accordance with user selections made via the quick task creation dialog.

9. A computing device comprising:
a processing system; and
one or more computer-readable media storing instructions that, when executed by the processing system, implement:
an on-screen keyboard of a user interface for the computing device having a plurality of keys each associated with a default character entry function; and
a quick task module operable to:
assign a quick tasks to at least one of the plurality of keys, the quick tasks configured to facilitate text editing functions;
recognize an operation of a single key, the recognition being in part based on receiving a touch or gesture input via the on-screen keyboard, the touch or gesture input being indicative of a selection of the single key;
determine an interaction scenario in connection with the operation of the single key, the determination being based at least in part on determining whether a text string in input of text is selected;
responsive to determining whether the interaction scenario is a first interaction scenario, causing performance of the character entry function associated with the particular key; and
responsive to determining whether the interaction scenario is a second interaction scenario, causing performance of the quick task assigned to the single key, the quick task automatically reformatting text according to a social networking format in response to operation of the single key, by removing one or more spaces between two or more words in the text,
wherein the selected text string is highlighted in the user interface.

10. A computing device as recited in claim 9, wherein the character entry function for the single key is performed when the first interaction scenario corresponds to a state in which a cursor for text entry is active.

11. A computing device as recited in claim 9, wherein the quick task for the particular key is performed when the second interaction scenario corresponds to a state in which the text string is selected.

12. A computing device as recited in claim 9, wherein the quick task assigned to at least one of the plurality of keys include a quick task to cause translation of selected text string between languages.

13. A computing device as recited in claim 9, wherein the quick task assigned to at least one of the plurality of keys include one or more formatting quick tasks to facilitate insertion of special characters, toggling of word case, toggling capitalization, switching between fonts, or setting of text effects in relation to selected text string.

14. A computing device as recited in claim 9, wherein the quick task assigned to at least one of the plurality of keys include one or more punctuation quick tasks which perform punctuation operations to insert characters before and after selected text string.

15. A computing device as recited in claim 9, wherein at least one of the quick tasks assigned to a corresponding key is associated with multiple modifications and operation of the corresponding key multiple times cycles through the multiple modifications to apply the multiple modifications successively to selected text string.

16. A method implemented by a client computing device, the method comprising:
assigning a quick task to a single key of multiple keys of an on-screen keyboard of a user interface displayed by a display of the client computing device, the quick task associated with multiple modifications to apply to selected text, the quick task facilitating text editing functions to modify the selected text by translating the selected text to one or more designated languages, the multiple modifications defined according to a data structure specifying an order in which to apply the modifications to the selected text;
receiving a touch or gesture input via the on-screen keyboard, the touch or gesture input being indicative of an operation of the single key;
recognizing an interaction scenario configured to trigger the quick task assigned to the single key, the recognition being based at least in part on determining whether a text string in input of text is selected; and
upon receiving the touch or gesture input and recognizing the interaction scenario, representing, on the display of the client computing device, the multiple modifications of the selected text responsive to successive operation of the single key by cycling through the order of the data structure and automatically causing the respective modifications to successively appear applied to the corresponding text in a user interface according to the order of the respective modifications in the data structure, the multiple modifications translating, by the client computing device, the selected text to two or more additional languages responsive to successive operation of the same single key, wherein the selected text string is highlighted in the user interface.

17. A method as recited in claim 16, wherein the quick task to facilitates text editing functions to modify the selected text string, the text editing functions including one or more of: formatting the selected text string, punctuation for the selected text string, symbol insertion in relation to the selected text string, or translation of the selected text string.

18. A method as recited in claim 16, wherein cycling through the order of the data structure further comprises reverting the selected text string to an unmodified form responsive to each modification of the multiple modifications in the data structure being presented and receipt of an additional operation of the single key.

19. A method as recited in claim 16, further comprising:
receiving an input from a user to change the assignment of the quick task from the single key to another single key of the multiple keys.

* * * * *